US006046890A

United States Patent [19]
Yamada et al.

[11] Patent Number: 6,046,890
[45] Date of Patent: Apr. 4, 2000

[54] METHOD FOR PROTECTING A MAGNETORESISTIVE HEAD FROM DAMAGE DUE TO ELECTROSTATIC DISCHARGE

[75] Inventors: Kenichiro Yamada; Yuji Uehara; Junzo Toda, all of Kawasaki, Japan

[73] Assignee: Fujitsu Limited, Kawasaki, Japan

[21] Appl. No.: 09/007,572

[22] Filed: Jan. 15, 1998

[30] Foreign Application Priority Data

Sep. 18, 1997 [JP] Japan ..................................... 9-253831

[51] Int. Cl.⁷ ...................................................... G11B 5/39
[52] U.S. Cl. ............................................................ 360/113
[58] Field of Search ..................................... 360/103, 113

[56] References Cited

U.S. PATENT DOCUMENTS

| 5,557,492 | 9/1996 | Gill et al. | 360/113 |
| 5,760,584 | 6/1998 | Frederick | 324/318 |
| 5,761,009 | 6/1998 | Hughbanks et al. | 360/113 |
| 5,822,153 | 10/1998 | Lairson et al. | 360/103 |

FOREIGN PATENT DOCUMENTS 09044820  2/1997  Japan .

OTHER PUBLICATIONS

L.H. Germer; "Electrical Breakdown between Close Electrodes in Air"; Journal of Applied Physics, vol. 30, No. 1; Jan. 1959; pp. 46–51.

*Primary Examiner*—Brian E. Miller
*Attorney, Agent, or Firm*—Greer, Burns & Crain, Ltd.

[57] ABSTRACT

A magnetoresistive head of the present invention is not easily damaged by electrostatic discharge, and is easy to manufacture. A magnetoresistance effect element is interposed between upper and lower shields composed of soft magnetic material through first and second gaps composed of an insulating material. The lower shield is connected to a slider via a slider protective film, which is an insulating substance. The magnetoresistive head is constructed so that a capacity Cg between the magnetoresistance effect element and the lower shield is 6.3 or more times a capacity between the lower shield and the slider by using a material (e.g., silicon carbide) exhibiting a large relative dielectric constant as, e.g., a second gap material.

13 Claims, 7 Drawing Sheets

METHOD FOR PROTECTING A MAGNETORESISTIVE HEAD FROM DAMAGE DUE TO ELECTROSTATIC DISCHARGE

BACKGROUND OF THE INVENTION

1. Field of the Invention

The present invention relates to a magnetoresistance effect type head and a magnetic recording/reproducing apparatus and, more particularly, to a magnetoresistive head including a soft magnetic shield and a magnetic recording/reproducing apparatus having the same magnetoresistive head.

2. Description of the Related Art

Some of magnetoresistive heads for detecting variations in magnetic field by use of a magnetoresistance effect element, include soft magnetic shields. FIG. 9 schematically shows a construction of this type of magnetoresistive head. As shown in FIG. 9, this type of magnetoresistive head is structured such that a magnetoresistance effect element 21 and an element terminal 22 are sandwiched in between an upper shield 25 and a lower shield 26 through first and second gaps 23, 24, and the lower shield 26 is connected via a slider protective film 27 to a slider 28.

The magnetoresistance effect element 21 involves the use of a spin valve element or an anisotropic magnetoresistance effect element. The first and second gaps 23, 24 and the slider protective film 27 involve the use of films each composed of an insulating material (normally alumina ($Al_2O_3$)). Further, the upper and lower shields 25, 26 involve the use of films each made of a magnetic material exhibiting a high magnetic permeability, (normally, NiFe) and what is used as the slider 28 is composed of AlTiC ($Al_2O_3.TiC$).

As known well, the magnetoresistive head described above is, after being formed by a thin film process, supplied to a manual operation on a table. On this occasion, it might happen that static electricity on the order of 100V is produced in a human body, and is therefore applied between the slider 28 and a unit consisting of the magnetoresistance effect element 21 and the element terminal 22 (the unit is hereinafter referred to as "a converting element unit"), with the result that discharging takes place between the converting element unit and the lower shield 26. As a consequence, it happened that the head was damaged (a performance was deteriorated).

In order to obviate such a problem, according to Japanese Patent Laid-Open Publication No. 9-44820, there is proposed such a contrivance that a dielectric substance having a capacitance on the order of 50 pF is provided between the element terminal and the lower shield. A construction of the magnetoresistive head disclosed in the above Publication and procedures of manufacturing the same head, will hereinafter be described with reference to FIG. 10.

According to the technique disclosed in Japanese Patent Laid-Open Publication No. 9-44820, at first, as shown in FIG. 10(A), alumina is deposited on a slider substrate 28, thereby forming the slider protective film 27. Subsequently, as illustrated in FIG. 10(B), NiFe is deposited thereon, and the lower shield 26 is thus formed.

Thereafter, as shown in FIG. 10(C), alumina is deposited in the vicinity of an air bearing surface (on a lower side in FIG. 10(C)), thereby forming a insulating film $24_1$ constituting a part of the second gap 24. Further, as shown in FIG. 10D, a dielectric film $24_2$ constituting the second gap 24 in combination with the insulating film $24_1$. Thereafter, as shown in FIG. 10(E), the magnetoresistance effect element 21 is formed on the insulating film $24_1$.

After forming the magnetoresistance effect element 21, as illustrated in FIG. 10(F), the element terminal 22 for detecting a change in resistance thereof is formed. Next, as shown in FIGS. 10(G) and 10(H), the first gap 23 and the upper shield 25 are formed, thereby obtaining the magnetoresistive head.

In the magnetoresistive head manufactured in these procedures, the capacitance between the element terminal 22 and the lower shield 26 increases, and hence discharging is hard to occur between the magnetoresistance effect element 21 and the lower shield 26. In this magnetoresistive head, however, the second gap 24 must be formed by combining two kinds of films, and therefore the manufacturing process becomes complicated.

SUMMARY OF THE INVENTION

Accordingly, it is a primary object of the present invention to provide a magnetoresistive head hard to be damaged by electrostatic discharge and easy to be manufactured.

It is another object of the present invention to provide a magnetic recording/reproducing apparatus including such a magnetoresistive head.

To accomplish the above objects, a magnetoresistance effect type head of the present invention comprises upper and lower shields composed of a soft magnetic material, a magnetoresistance effect element interposed between the upper and lower shields through first and second insulating layers, and a slider connected to the lower shield via a slider protective film defined as an insulating substance, wherein a capacity between the magnetoresistance effect element and the lower shield is not less than 6.3 times a capacity between the lower shield and the slider.

More specifically, according to the present invention, when manufacturing the magnetoresistive head, there is adopted any one of constructions (or methods) in which (I) the second insulating layer is formed by use of such a material that a capacitance (hereinafter referred to as a gap capacity) between the magnetoresistance effect element and the lower shield increases, (II) the slider protective film is formed by use of such a material that a capacity between the lower shield and the slider decreases (the capacity hereinafter referred to as a protective film capacity), (III) the second insulating layer is formed by using such a material that the gap capacity increases, and the slider protective film is formed by use of such a material that the protective film capacity decreases, and (IV) there is employed the slider protective film being in such a configuration that a distance between the slider and the second shield becomes wider on the internal side than on the side of an air bearing surface. The capacity between the magnetoresistance effect element and the lower shield is thereby set to 6.3 or more times the capacity between the lower shield and the slider.

If the magnetoresistive head is constructed in this way, and when a voltage of approximately 100V is applied between the magnetoresistance effect element and the slider, the voltage applied between the magnetoresistance effect element and the lower shield can be reduced down to a start-of-discharge voltage or under. Accordingly, there is obtained the magnetoresistive head that is not easily damaged by the static electricity when in manual operations. Further, as a result, when the present magnetoresistive head is employed, it is feasible to obtain a high yield in manufacturing both the magnetoresistive heads and the magnetic recording/reproducing apparatus in which the heads are installed.

Moreover, the magnetoresistive head having the constructions I–III can be attained by the manufacturing process including the same number of steps as those in the manufacturing process of the normal magnetoresistive head. Moreover, in the case of adopting the construction I, if the second insulating layer is composed of a material exhibiting the relative dielectric constant of 13.5 or larger, the magnetoresistive head which is protected from damages by an electrostatic discharge can be actualized without changing the configurations and the materials, adopted so far, of the respective portions excluding the second insulating layer. In addition, when adopting the construction II, if the slider protective film is composed of a material showing a relative dielectric constant of 4.4 or smaller, the magnetoresistive head which is not easily by an electrostatic discharge can be attained without changing the configurations and the materials, adopted so far, of the respective portions exclusive of the slider protective film.

The magnetoresistive head having the construction IV is more complicated in terms of its manufacturing process than the magnetoresistive heads having the constructions I–III. There is no necessity for its being formed with two kinds of films adjacent to each other, and hence the magnetoresistive head having the construction IV is manufactured easier than the magnetoresistive head disclosed in Japanese Patent Laid-Open Publication No. 9-44820. Further, when adopting the construction IV, the magnetoresistive head can be made even if alumina remains unchanged as the material of the slider protective film.

Note that the magnetoresistance effect element used when making the magnetoresistance effect head according to the present invention, may be a spin valve element or anisotropic magnetoresistance effect element. Moreover, the materials used for forming the second insulating layer and the slider protective film may be sufficient on condition that the capacitance between the magnetoresistance effect element and the lower shield can be set 6.3 or more times the capacity between the lower shield and the slider.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Illustrative embodiments of the present invention will hereinafter be specifically described with reference to the accompanying drawings.

Figure 1:
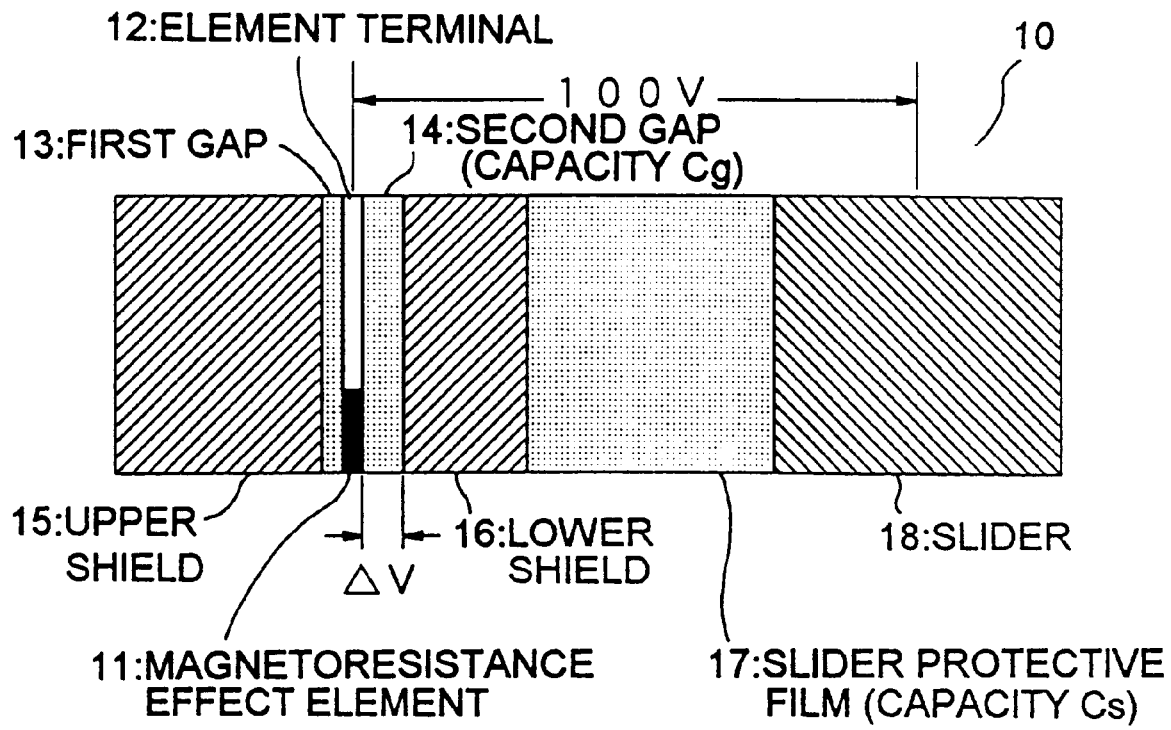
FIG. 1 is an explanatory diagram showing a embodiment of the present invention.

To start with, referring to FIGS. 1 and 2, there will be explained a simulation conducted for determining a construction of a magnetoresistive head in the respective embodiments which will hereinafter be discussed.

As already explained, it might happen that a voltage on the order of 100V is applied between a magnetoresistance effect element, an element terminal and a slider when in operations relative to the magnetoresistive head. Therefore, the present inventors investigate, first, assuming that the voltage applied between a part consisting of a magnetoresistance effect element 11 and an element terminal 12 (the part is hereinafter referred to as a converting element part) and a slider 18 is 100V as schematically shown in FIG. 1, how a voltage ΔV applied between the converting element part and a lower shield 16 (the voltage ΔV is hereinafter referred to as an second gap voltage) changes corresponding to a structure of a magnetoresistive head 10 by means of simulation with a circuit simulator "SPICE". Note that a circuit model of the magnetoresistive head used in the simulation is the same as a model appeared on, e.g., pp. 322–330 in the article titled "EOS/ESD SYMPOSIUM 95", and hence an explanation of details thereof is omitted.

As a result of the simulation, it can be understood that there must exist a relation shown in FIG. 2 between the second gap voltage ΔV and a ratio Cg/Cs of a capacity Cg (hereinafter referred to as a gap capacity) between the converting element part and the lower shield 16 to a capacity Cs (hereinafter termed a protective film capacity) between the lower shield 16 and the slider 18.

On the other hand, it is a prevailing notion that discharging between two electrodes disposed at a narrow spacing (not greater than several μm) is largely influenced by an emission of electrons by a field emission mechanism (see, e.g., Germer, L. H. "Electrical Breakdown between close electrodes in air", J. Appl. Phys., 30, 1, pp. 46–51 (1959)). Then, it is also known that a field emission condition thereof occurs just when the electric field exceeding 75 MV/m (V/μm) is applied between the electrodes without depending on the electrodes (see, e.g., Schaffert, R. M, "Electrophotography", Focall Press, New York (1975)). It is also generally known that an angular part of the electrode bears the maximum intensity of the electric field when the voltage is applied between the electrodes. Then, a further prevailed notion is that if a space between the electrodes is vacuum (air), and if a dielectric substance exhibiting a relative dielectric constant ∈ exists between the electrodes, an intensity of the electric field in the former case is ∈-times an intensity of the electric field in the latter case when a charge quantity of the electrodes is the same.

Accordingly, in the magnetoresistive head provided with a second gap 14 defined as a dielectric substance and having a narrow width (a small thickness), when an electric field exceeding 75 MV/m is applied between the magnetoresistance effect element 11 and the lower shield 16, it follows that the electricity is transferred through the air from the angular part kept in contact with an air bearing surface of the lower shield 16 or the magnetoresistance effect element 11, resulting in a state of the discharging taking place.

Namely, supposing that a thickness of the second gap 14 is 0.1 μm, the discharging occurs just when a second gap voltage ΔV comes to 7.5V or greater irrespective of a material of the second gap 14.

Figure 2:
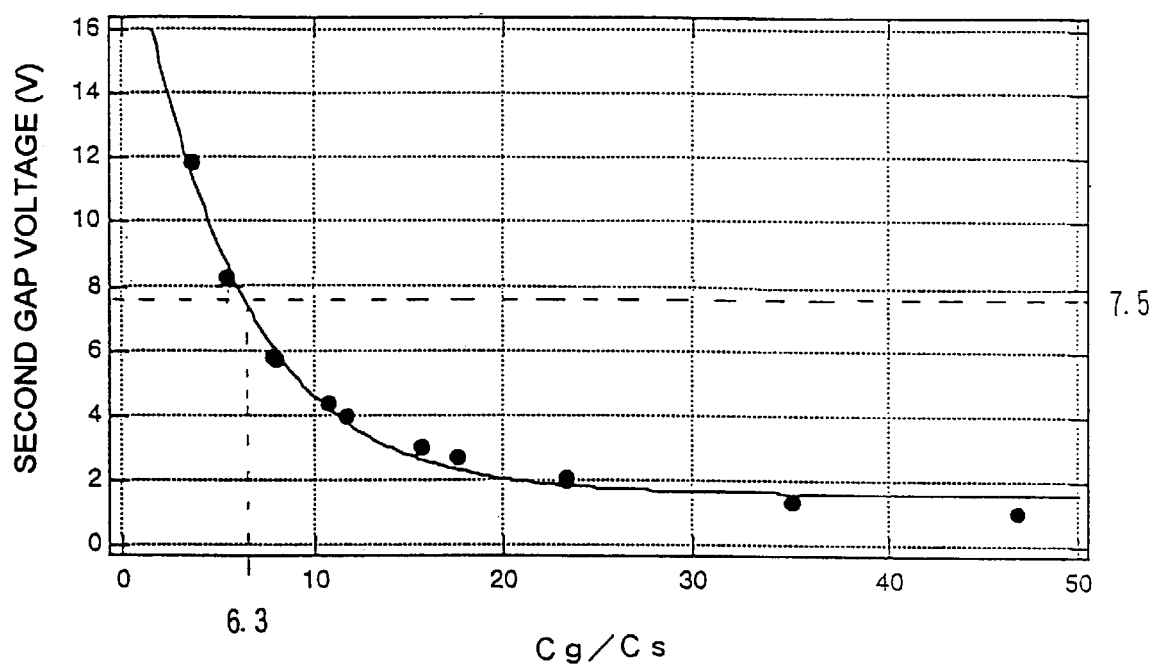
FIG. 2 is a graph showing a relationship between a second gap voltage and a ratio between a gap capacity to a protective film capacity.

Hence, in order for the discharging not to occur in the second gap 14 having a thickness of 0.1 μm when manually operated, as obvious from FIG. 2, the ratio Cg/Cs of the gap capacity Cg of the magnetoresistive head to the protective film capacity Cs may be set to 6.3 or larger. Note that the ratio Cg/Cs of the magnetoresistive head manufactured previously by the present inventors in which the respective gaps and the slider protective film are composed of alumina (which is hereinafter referred to as a conventional magnetoresistive head), is 3.6, and it is also confirmed from FIG. 2 that the head tends to be damaged by the static electricity.

Now, what can be adopted for setting the capacity ratio Cg/Cs to 6.3 or greater may be a method of reducing the protective film capacity Cs, increasing the gap capacity Cg or increasing the gap capacity Cg while decreasing the protective film capacity Cs.

If the thickness (a length in the crosswise direction in FIG. 1) of the slider protective film 17 is simply increased to decrease the protective film capacity Cs, however, this might lead to an increment in occurrence frequency of noises (thermal asperity) caused by a collision with the magnetoresistance effect element assuming a protrusive defect on a medium. To be specific, it is desirable that a distance between the slider 18 and the magnetoresistance effect element 11 be, it is known, set to 6 μm or smaller in order to prevent the occurrence of the thermal asperity. Then, a thickness on the order of 1 μm is required of the lower shield 16, and therefore the slider protective film 17 is eventually required to have its thickness of 5 μm or under (the thickness of the slider protective film of the magnetoresistive head manufactured at the present is 4.5–5 μm). Accordingly, it is not desirable that the protective film capacity Cs be reduced by simply increasing the thickness of the slider protective film 17.

Such being the case, in accordance with one embodiment of the present invention, the magnetoresistive head 10 is provided with the slider protective film 17 composed of material having a relative dielectric constant ∈ of 4.4 or smaller. If the slider protective film 17 composed of the above material is used, the protective film capacity Cs becomes approximately 57% or less of the protective film capacity when using the slider protective film composed of alumina (∈≈7.7) in the same configuration. Hence, the ratio Cg/Cs of the magnetoresistive head to be manufactured can be set to 6.3 that is 1.75 times the ratio Cg/Cs (3.6) of the conventional magnetoresistive head including the slider protective film composed of alumina.

As described above, if the slider protective film 17 is formed of the material exhibiting the relative dielectric constant ∈ of 4.4 or less, it is feasible to obtain the magnetoresistive head that is not easily damaged by the static electricity (wherein the capacity ratio Cg/Cs becomes 6.3 or greater) without changing materials and configurations of other portions and also a configuration of the slider protective film. Moreover, the magnetoresistive head can be manufactured simply by changing the raw material used when forming the slider protective film 17.

Note that the materials having the relative dielectric constant ∈ of 4.4 or less are polyethylene (∈≈2.3), polypropylene (∈≈2.0), polystyrene (∈≈2.5), polycarbonate (∈≈2.9), fluoroplastic (∈≈2.4) and quartz glass (∈≈3.5), any of which can be used for forming the slider protective film 17.

Further, in another embodiment of the present invention, the magnetoresistive head is provided with the second gap 14 composed of a material the relative dielectric constant of which is 13.5 or larger. When using the second gap composed of such a material, the gap capacity Cg becomes 1.75 or more times the gap capacity in the case of using the second gap composed of alumina (∈≈7.7) in the same configuration. Accordingly, the ratio Cg/Cs of the magnetoresistive head to be manufactured comes to 6.3, that is 1.75 times the ratio Cg/Cs of the conventional magnetoresistive head including the second gap composed of alumina.

Namely, if the second gap 14 is formed of the material exhibiting the relative dielectric constant ∈ of 13.5 or greater, it is possible to obtain the magnetoresistive head that is protected from damage by the static electricity without changing the materials and the configurations of other portions and also the configuration of the second gap 14. Moreover, this magnetoresistive head can also be manufactured simply by varying the raw material used when forming the second gap 14.

Note that the materials for which the relative dielectric constant ∈ is above 13.5 are polyimide (∈≈35) and silicon carbide (∈≈40) that are classified as a paraelectric substances, titanium oxide (∈≈100), barium titanate series oxide (∈≈1200), strontium titanate series oxide and calcium titanate series oxide (∈≈150) that are classified as a ferroelectric substances, and sodium niobate series oxide (∈≈80) classified as an antiferroelectric material, any of which is usable for forming the second gap 14.

In accordance with another embodiment of the present invention, the capacity ratio Cg/Cs is set to 6.3 or greater by use of a material exhibiting a comparatively small relative dielectric constant to form a second material in combination with a material having a comparatively large relative dielectric constant to form the slider protective film 17. With this contrivance adopted, it is feasible to manufacture the magnetoresistive head taking the same configuration as that in the prior art by using a material having the relative dielectric constant of 13.5 or under to form the second gap 14, and to manufacture the magnetoresistive head taking the same configuration as that in the prior art by using a material exhibiting the relative dielectric constant of 4.4 or larger to form the slider protective film 17.

In accordance with still another embodiment, the magnetoresistive head having the capacity ratio Cg/Cs on the order of 6.3 or more by providing the slider protective film assuming such a configuration that a distance between the slider and the lower shield becomes wider on the internal side than on the side of the air bearing surface. Namely, the thickness of the slider protective film on the air bearing surface is set to, e.g., approximately 5 μm in order not to deteriorate the characteristic pertaining to the thermal asperity, and the slider protective film is given such a configuration that the thickness on the internal side is larger than the thickness on the air bearing surface, whereby the protective film capacity increases enough to set Cg/Cs to 6.3 or greater.

With this contrivance adopted, the magnetoresistive head which is not easily damaged by an electrostatic discharge can be manufactured even by using alumina for forming the slider protective film as in the case of the prior art.

Figure 3:
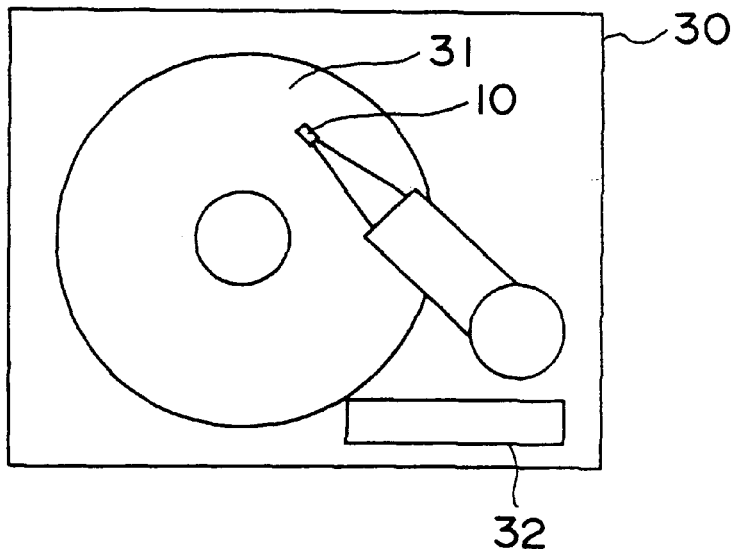
FIG. 3 is a view schematically illustrating a magnetic recording/reproducing apparatus constructed by use of a magnetoresistive head according to the present invention.

Then, as illustrated in FIG. 3, if a magnetic recording/reproducing apparatus 30 is manufactured by combining the magnetoresistive head 10 in each embodiment described above with a magnetic recording medium 31 and a control system 32 etc, normally functioning magnetic recording/reproducing apparatus can be extremely simply manufactured (with a high yield).

First Embodiment

Figure 4:
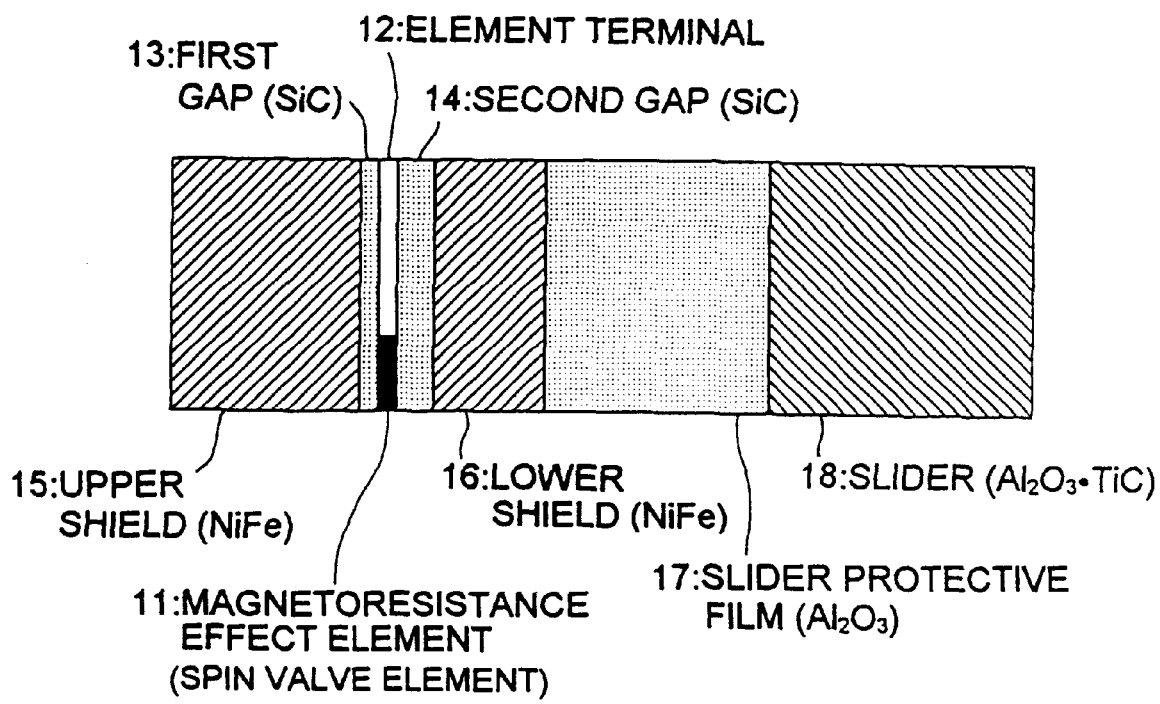
FIG. 4 is a diagram schematically showing a construction of the magnetoresistive head in a first embodiment of the present invention.

FIG. 4 shows a construction of the magnetoresistive head in a first embodiment of the present invention. As shown in FIG. 4, the magnetoresistive head in the first embodiment has, as in the case of the prior art magnetoresistive head, such a construction that a magnetoresistance effect element 11 and an element terminal 12 are interposed between an upper shield 15 and a lower shield 16 through first and second gaps 13, 14, and the lower shield 16 is connected to a slider 18 via a slider protective film 17. Further, the configurations and constructive materials of the respective portions excluding the first and second gaps 13, 14 are the same as those in the conventional magnetoresistive head. For instance, the lower shield 16 involves the use of NiFe having a thickness of 1 $\mu$m, and the slider protective film 17 involves the use of alumina having a thickness of 5 $\mu$m.

In accordance with the first embodiment, however, the first and second gaps 13, 14 are composed not of alumina (the relative dielectric constant $\in$=7.7) but of silicon carbide (the relative dielectric constant $\in$=40).

Figure 5A:
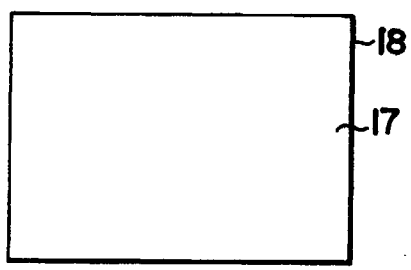
FIGS. 5(A)–5(G) is an explanatory diagrams showing a manufacturing process of the magnetoresistive head in the first embodiment.

More specifically, in the first embodiment, at first, as shown in FIG. 5(A), alumina is deposited 5 $\mu$m in thickness on the slider substrate 18, thereby forming the slider protective film 17. Subsequently, as illustrated in FIG. 5(B), NiFe is deposited 1 $\mu$m in thickness, thereby forming the lower shield 16.

Figure 5E:
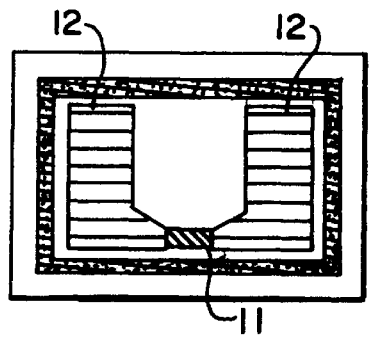
Figure 5B:
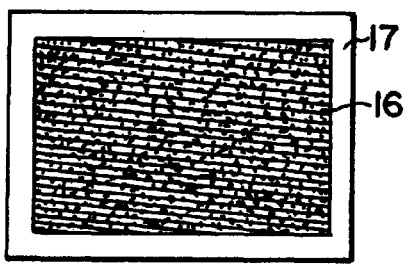
Figure 5F:
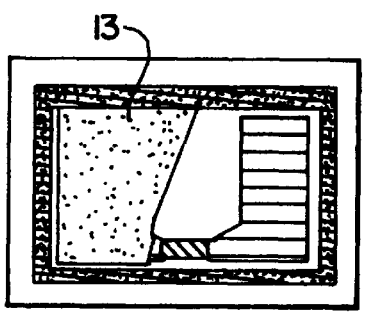
Figure 5C:
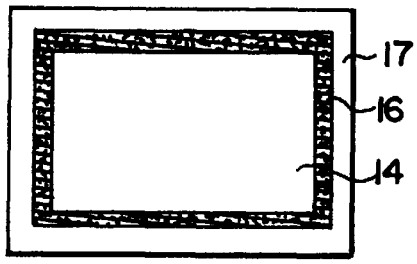
Figure 5G:
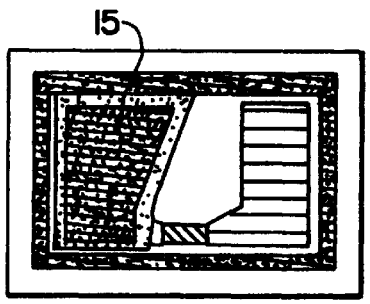
Figure 5D:
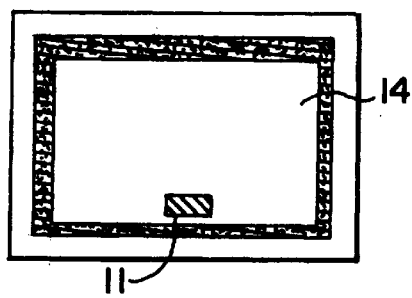

Thereafter, as illustrated in FIG. 5(C), silicon carbide is deposited 0.1 $\mu$m, thereby forming the second gap 14. Moreover, as shown in FIG. 5(D), the magnetoresistance effect element 11 is formed. Note that a so-called spin valve element is formed as the magnetoresistance effect element 11 in the first embodiment. Namely, in a step shown in FIG. 5(D), a laminated structure (the spin valve element) consisting of a magnetic layer, an intermediate layer, a magnetic layer and an antiferromagnetic layer, are manufactured.

After forming the magnetoresistance effect element 11, as illustrated in FIG. 5(E), the element terminal 12 (Ti/Au/Ti) for detecting a variation in resistance is formed. Subsequently, as shown in FIGS. 5(F) and 5(G), the first gap 13 and the upper shield 15 are formed by sequentially depositing silicon carbide and NiFe, whereby the magnetoresistive head having the construction shown in FIG. 4 is obtained.

Thus, the magnetoresistive head in the first embodiment includes the second gap 14 composed of silicon carbide (the relative dielectric constant $\in$=40), and hence the ratio of the capacity Cs of the slider protective film 17 to the capacity Cg of the second gap 14 is approximately 19. Therefore, even when a voltage on the order of 100V is applied between the element terminal and the slider when in operations on the table, the second gap voltage of the present magnetoresistive head only becomes approximately 2.5V (see FIG. 2), and it follows that no discharging takes place. As a matter of fact, in the manufactured magnetoresistive head, the discharging does not occur even when intentionally applying the voltage of 100V between the element terminal and the slider.

Second Embodiment

Figure 6:
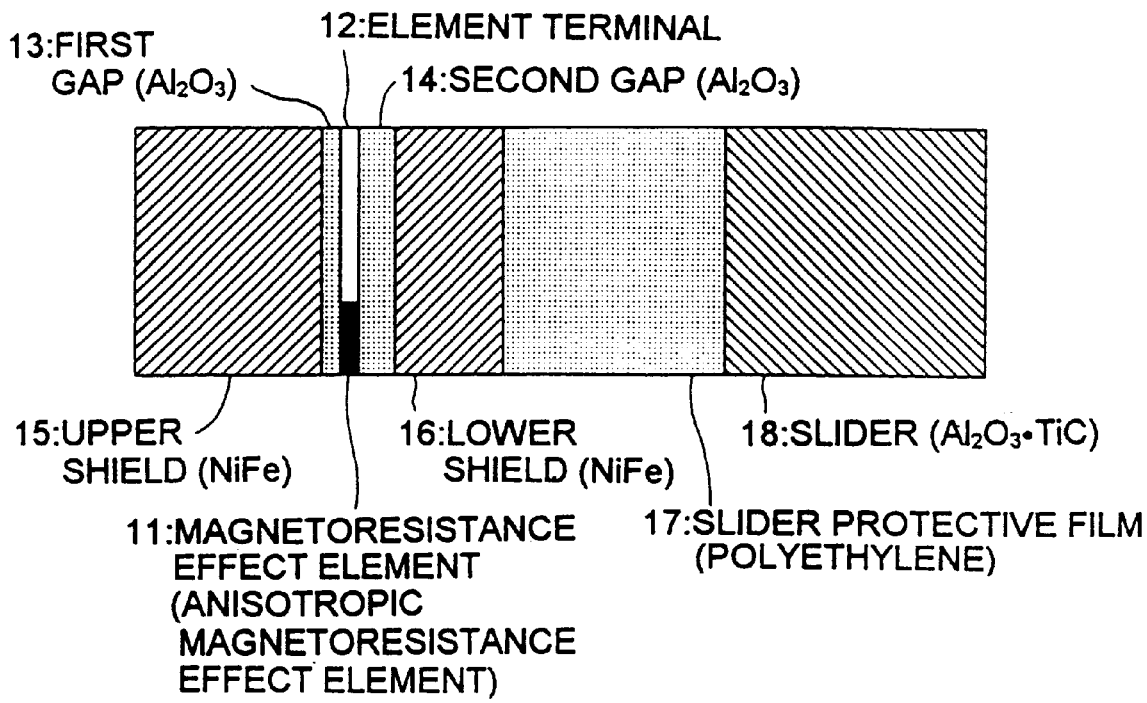
FIG. 6 is a diagram schematically illustrating a construction of the magnetoresistive head in a second embodiment of the present invention.

FIG. 6 shows a construction of the magnetoresistive head in a second embodiment. As illustrated in FIG. 6, the magnetoresistive head in the second embodiment has, as in the case of the normal magnetoresistive head, such a construction that the magnetoresistance effect element 11 (an anisotropic magnetoresistance effect element in the second embodiment) and the element terminal 12 are interposed between the upper shield 15 and the lower shield 16 through the first and second gaps 13, 14, and the lower shield 16 is connected to the slider 18 via the slider protective film 17. Further, the configurations and constructive materials of the respective portions excluding the slider protective film 17 are the same as those in the magnetoresistive head including the normal anisotropic magnetoresistance effect element. For example, the second gap 14 involves the use of alumina having a thickness of 0.1 $\mu$m, and the lower shield 16 involves the use of NiFe having a thickness of 1 $\mu$m.

In accordance with the second embodiment, however, the configuration of the slider protective film 17 used herein is the same as the conventional one and composed of not alumina but polyethylene (the relative dielectric constant $\in$=2.3). Note that the manufacturing process of the magnetoresistive head in the second embodiment is substantially the same in the first embodiment, and therefore its explanation is omitted.

Hence, the capacity of the protective film of the magnetoresistive head in the second embodiment is approximately 30% of the capacity of the protective capacity when using the slider protective film composed of alumina (the relative dielectric constant $\in$=7.7). Accordingly, the capacity ratio Cg/Cs between the second gap 14 and the slider protective film 17 in the present magnetoresistive head, is 12, which is approximately 3.3 times the capacity ratio of the conventional magnetoresistive head. Consequently, the second gap voltage in the present magnetoresistive head increases up to approximately 3.9V at the most enough not to cause the discharging even if the voltage of about 100V is applied between the element terminal and the slider when in the operations on the table (see FIG. 2). Incidentally, it is also confirmed that the discharging does not occur by intentionally applying the voltage of 100V between the element terminal and the slider in the magnetoresistive head in accordance with the second embodiment.

Third Embodiment

Figure 7:
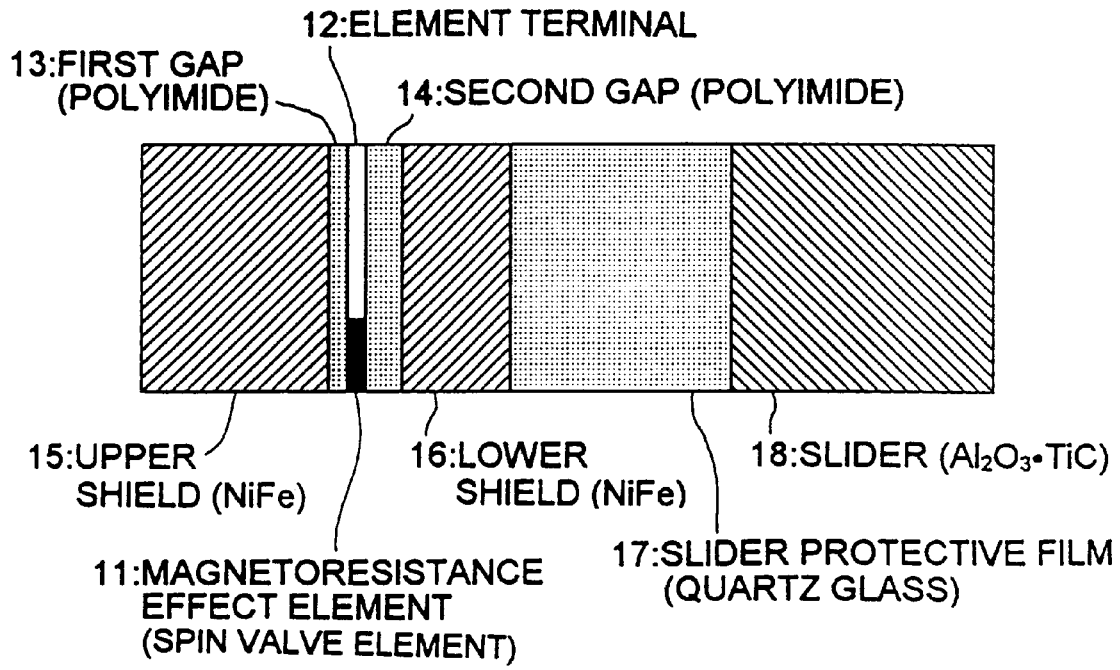
FIG. 7 is a diagram schematically illustrating a construction of the magnetoresistive head in a third embodiment of the present invention.

FIG. 7 shows a construction of the magnetoresistive head in a third embodiment. As illustrated in FIG. 7, the magnetoresistive head in the third embodiment has, as in the case of the normal magnetoresistive head, such a construction that the magnetoresistance effect element 11 (a spin valve element in the third embodiment) and the element terminal 12 are interposed between the upper shield 15 and the lower shield 16 through the first and second gaps 13, 14, and the lower shield 16 is connected to the slider 18 via the slider protective film 17. Further, the configurations and constructive materials of the respective portions excluding the first and second gaps 13, 14 and the slider protective film 17 are the same as those in the magnetoresistive head including the normal anisotropic magnetoresistance effect element. In accordance with the third embodiment, however, the slider protective film 17 is composed of not alumina but quartz glass (the relative dielectric constant $\in$≈3.5), and the first and second gaps 13, 14 are each composed of polyimide (the relative dielectric constant $\in$≈35).

Therefore, the capacity ratio Cg/Cs between the second gap 14 and the slider protective film 17 in the present magnetoresistive head, is approximately 36. As obvious from FIG. 2, the head is constructed so that the second gap voltage increases up to approximately 1.3V at the most even if the voltage of about 100V is applied between the element terminal and the slider.

Fourth Embodiment

Figure 8:
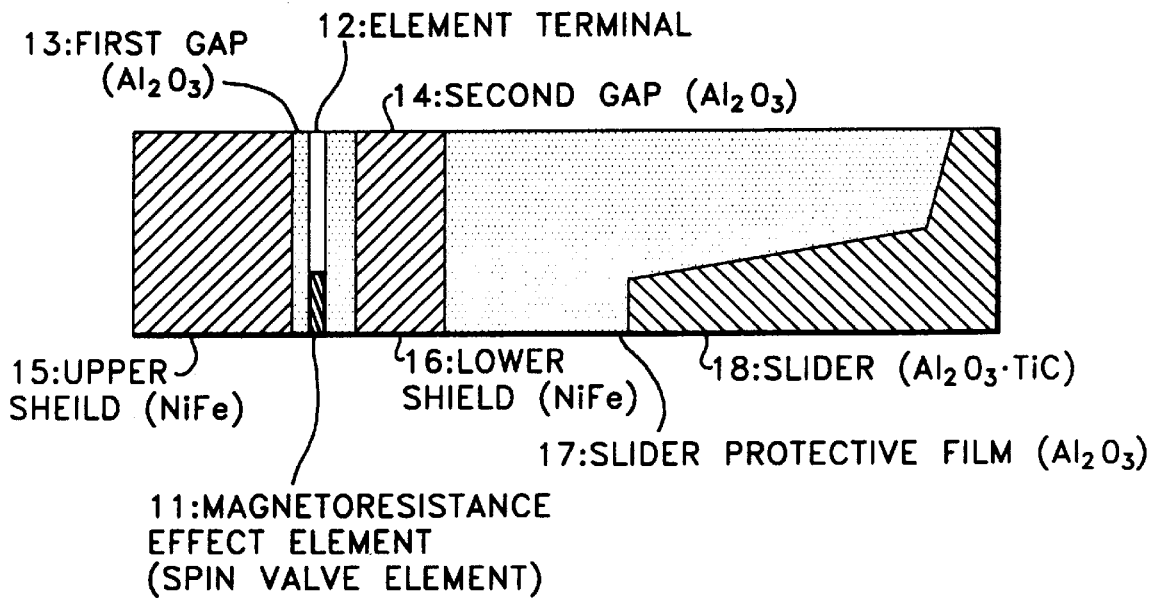
FIG. 8 is a diagram schematically illustrating a construction of the magnetoresistive head in a fourth embodiment of the present invention.
Figure 9:
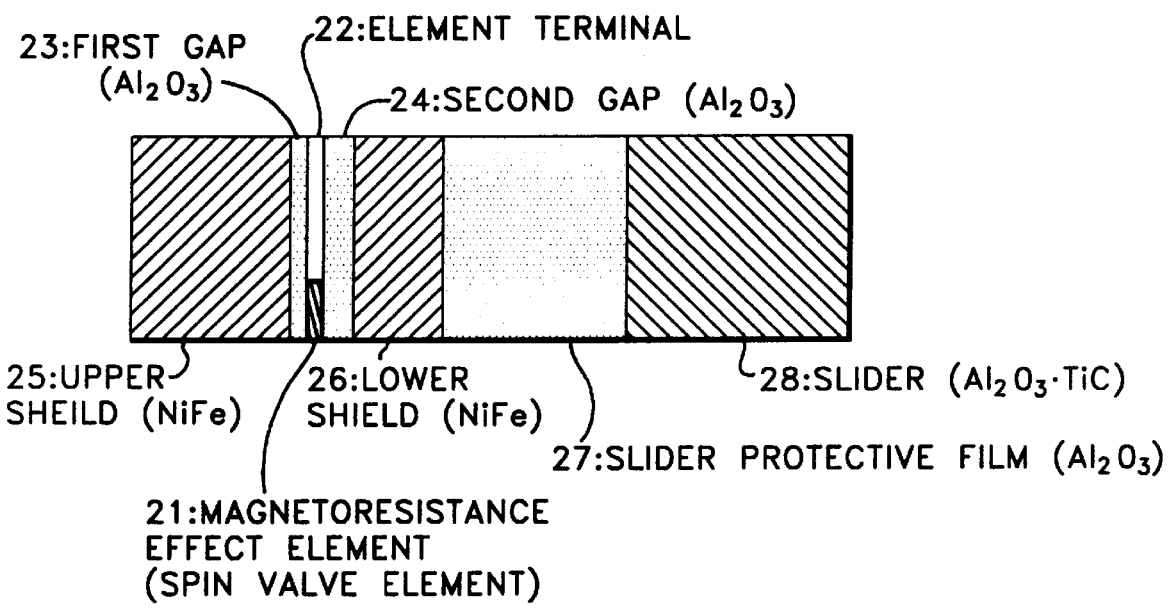
FIG. 9 is a diagram schematically illustrating a construction of a conventional magnetoresistive head.
Figure 10A:
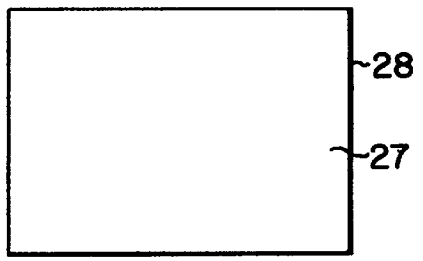
FIGS. 10(A)–10(H) is an explanatory diagrams showing a manufacturing process of a magnetoresistive head disclosed in Japanese Patent Laid-Open Publication No. 9-44820.
Figure 10B:
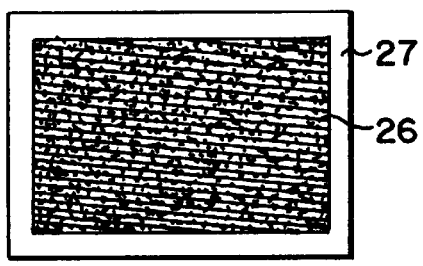
Figure 10C:
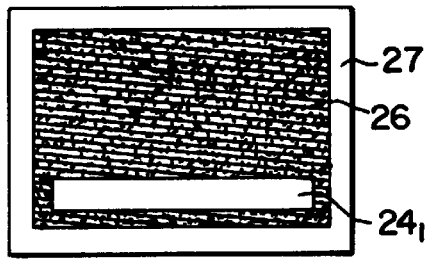
Figure 10D:
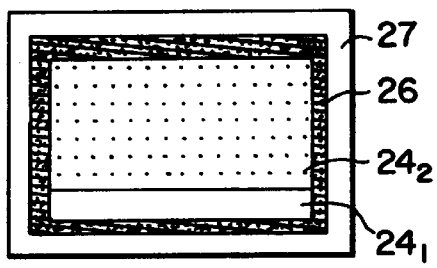
Figure 10E:
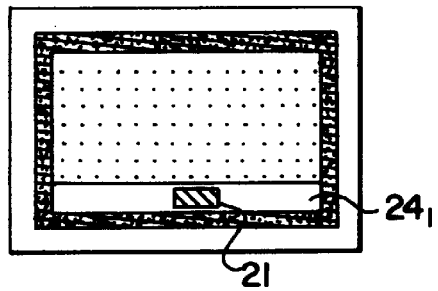
Figure 10F:
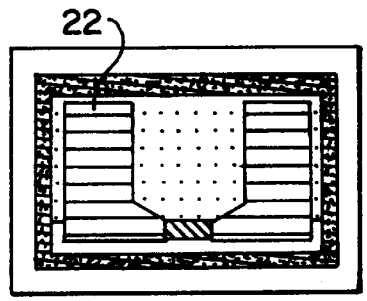
Figure 10G:
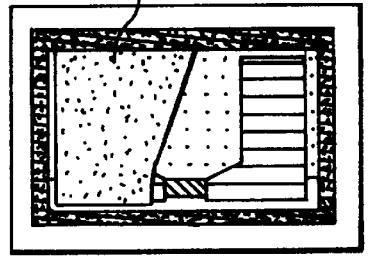
Figure 10H:
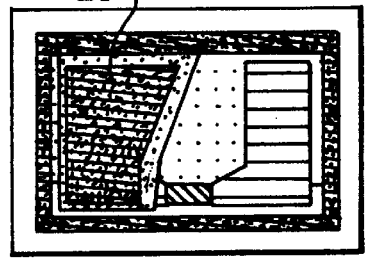

FIG. 8 schematically illustrates a construction of the magnetoresistive head in accordance with a fourth embodiment of the present invention. As shown in FIG. 8, a slider 18' and a slider protective film 17' of the magnetoresistive head in the fourth embodiment, takes configurations different from those of the slider 18 and the slider protective film 17 of each of the magnetoresistive heads in the first through third embodiments.

Procedures of manufacturing this magnetoresistive head will hereinafter be briefly explained. In the fourth embodiment, to begin with, there is obtained such a configuration of the slider protective film 17' that the thickness on the side of the air bearing surface can be set to 5 μm, and the capacity ratio can also be set such as Cg/Cs≈6.5 with a material of the relative dielectric constant ∈≈7.7 on the premise that alumina is used for forming the slider protective film 17'. Next, a substrate turned out to be the slider 18' is formed with a recessed portion by processing this substrate so as to form that configuration. Then, alumina is deposited on the processed substrate, thereby forming the slider protective film 17', and thereafter, in the same procedures as those in the first embodiment, the lower shield 16 and the second gap 13 are formed, whereby the illustrated magnetoresistive head is obtained.

Namely, in accordance with the fourth embodiment, the effective thickness of the slider protective film is increased while keeping a state enough to prevent an occurrence of noises caused by collisions with the protruded substances, and consequently the slider protective film comes to have such a configuration that the spacing between the slider and the lower shield is larger on the internal side than on the side of the air bearing surface. With this construction too, the capacity ratio Cg/Cs can be set to 6.3 or more, and hence it is possible to obtain the magnetoresistive head in which the damage by the static electricity does not easily occur.

Modified Embodiment

The magnetoresistive head shown in each embodiment may be modified in a variety of forms. For example, both of the first and second embodiments are composed of silicon carbide in the first embodiment, however, other materials (e.g., alumina) may be used for forming the first gap. Similarly in the third embodiment, the first and second gaps may be formed by using different materials, respectively.

Further, in the fourth embodiment, alumina is used as the material of the slider protective film, however, and, if the material exhibiting much smaller relative dielectric constant is employed, the processing quantity of the substrate can be reduced, or alternatively the value of Cg/Cs can be made much larger. Moreover, in the fourth embodiment, the substrate is formed with the recessed portion, however, the construction as illustrated in FIG. 8 can be attained by forming a protruded portion on the substrate.

Further, an interface between the slider and the slider protective film is formed flat, and the slider protective film, the thickness of which is smaller on the side of the air bearing surface, is formed on the flat interface, whereby the capacity ratio Cg/Cs may be set to 6.3 or greater while keeping the spacing of approximately 5 μm between the slider and the lower shield on the air bearing surface. Furthermore, it is feasible to adopt such a configuration that both of the interface between the slider and the slider protective film and an interface between the slider protective film and the lower shield are bent. In these cases, however, it is difficult to form the second gap and the magnetoresistance effect element etc on the lower shield, and hence, as in the fourth embodiment, it is desirable that the flat lower shield be previously formed.

It is apparent that, in this invention, a wide range of different working modes can be formed based on the invention without deviating from the spirit and scope of the invention. This invention is not restricted by its specific working modes except being limited by the appended claims.

What is claimed is:

1. A magnetoresistive head comprising:
   upper and lower shields composed of a soft magnetic material;
   a magnetoresistance effect element interposed between said upper and lower shields through first and second insulating layers; and
   a slider connected to said lower shield via a slider protective film defined as an insulating substance,
   wherein a first capacity between said magnetoresistance effect element and said lower shield is not less than 6.3 times a second capacity between said lower shield and said slider.

2. A magnetoresistive head according to claim 1, wherein said second insulating layer is composed of a material exhibiting a relative dielectric constant of 13.5 or greater.

3. A magnetoresistive head according to claim 2, wherein said second insulating layer is composed of any one of polyimide and silicon carbide.

4. A magnetoresistive head according to claim 2, wherein said second insulating layer is composed of a ferroelectric material.

5. A magnetoresistive head according to claim 4, wherein the ferroelectric material is composed of any one of titanium oxide, barium titanate series oxide, strontium titanate series oxide and calcium titanate series oxide.

6. A magnetoresistive head according to claim 2, wherein said second insulating layer is composed of an antiferroelectric material.

7. A magnetoresistive head according to claim 6, wherein the antiferroelectric material is sodium niobate series oxide.

8. A magnetoresistive head according to claim 1, wherein said slider protective film is in such a configuration that a distance between said slider and said lower shield is wider on an internal side than on an air bearing surface.

9. A magnetoresistive head according to claim 1, wherein said slider protective film is composed of a material exhibiting a relative dielectric constant of 4.4 or less.

10. A magnetoresistive head according to claim 9, wherein the material is any one of quartz glass, polyethylene, polypropylene, polystyrene, polycarbonate and fluoroplastic.

11. A magnetoresistive head according to claim 1, wherein said magnetoresistance effect element is a spin valve element.

12. A magnetoresistive head according to claim 1, wherein said magnetoresistance effect element is an anisotropic magnetoresistance effect element.

13. A magnetic recording/reproducing apparatus comprising:
   a magnetic recording medium;
   a control system; and
   a magnetoresistive head having upper and lower shields composed of a soft magnetic material, a magnetoresistance effect element interposed between said upper and lower shields through first and second insulating layers, and a slider connected to said lower shield via a slider protective film defined as an insulating substance, wherein a first capacity between said magnetoresistance effect element and said lower shield is not less than 6.3 times a second capacity between said lower shield and said slider.

* * * * *

UNITED STATES PATENT AND TRADEMARK OFFICE
CERTIFICATE OF CORRECTION

PATENT NO. : 6,046,890
DATED : April 4, 2000
INVENTOR(S) : Yamada et al.

It is certified that error appears in the above-identified patent and that said Letters Patent is hereby corrected as shown below:

On the Face of the Patent

Under "[54] Title", please delete "METHOD FOR PROTECTING A MAGNETORESISTIVE HEAD FROM DAMAGE DUE TO ELECTROSTATIC DISCHARGE" and insert -- METHOD AND APPARATUS FOR PROTECTING A HEAD FROM DAMAGE DUE TO ELECTROSTATIC DISCHARGE-- therefor Signed and Sealed this Fifth Day of June, 2001

Attest:

*Attesting Officer*

NICHOLAS P. GODICI

*Acting Director of the United States Patent and Trademark Office*